US006795408B1

(12) United States Patent
Hiett

(10) Patent No.: US 6,795,408 B1
(45) Date of Patent: Sep. 21, 2004

(54) NETWORKING SYSTEM FOR MOBILE DATA COMMUNICATIONS

(75) Inventor: John H. Hiett, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/475,337

(22) Filed: Dec. 30, 1999

Related U.S. Application Data

(63) Continuation-in-part of application No. 09/224,214, filed on Dec. 30, 1998.

(51) Int. Cl.$^7$ .............................................. H04B 7/212
(52) U.S. Cl. ........................ 370/323; 338/401; 338/428
(58) Field of Search ............................... 370/310, 315, 370/316, 317, 319, 320–326, 358, 352, 356, 338, 400–401, 428; 455/12.1, 13.1, 427

(56) References Cited

U.S. PATENT DOCUMENTS

| | | | | |
|---|---|---|---|---|
| 5,717,878 A | | 2/1998 | Sannino | 395/327 |
| 5,852,721 A | * | 12/1998 | Dillon et al. | 709/217 |
| 5,915,008 A | * | 6/1999 | Dulman | 379/221.08 |
| 6,091,737 A | * | 7/2000 | Hong et al. | 370/431 |
| 6,160,797 A | * | 12/2000 | Robert et al. | 370/316 |
| 6,185,427 B1 | * | 2/2001 | Krasner et al. | 455/456 |
| 6,201,797 B1 | * | 3/2001 | Leuca et al. | 370/316 |
| 6,282,193 B1 | * | 8/2001 | Hluchyj et al. | 370/356 |
| 6,295,293 B1 | * | 9/2001 | Tonnby et al. | 370/389 |
| 6,333,931 B1 | * | 12/2001 | LaPier et al. | 370/385 |
| 6,359,894 B1 | * | 3/2002 | Hong et al. | 370/402 |
| 6,377,571 B1 | * | 4/2002 | Tai | 370/355 |
| 6,389,464 B1 | * | 5/2002 | Krishnamurthy et al. | 709/220 |
| 6,404,736 B1 | * | 6/2002 | Arkko et al. | 370/230 |
| 6,452,915 B1 | * | 9/2002 | Jorgensen | 370/338 |
| 6,477,152 B1 | * | 11/2002 | Hiett | 370/316 |
| 6,496,702 B1 | * | 12/2002 | Lockhart | 455/456 |

FOREIGN PATENT DOCUMENTS

GB  2 304 499  3/1997
GB  2 313 981  12/1997

OTHER PUBLICATIONS

ARINC741, Part 4, *Aviation Satellite Communication System: Specification and Description Language*, May 15, 1992, AEEC.
ARINC741, Part 3, *Aviation Satellite Communication System: Specification and Description Language*, Jan. 15, 1994, AEEC.
ARINC622–2, *ATS Data Link Applications Over ACARS Air–Ground Network*, Dec. 20, 1994, AEEC.
ARINC746, *Cabin Communications Systems*, Apr. 1, 1996, AEEC.
ARINC741, Part 2, *Aviation Satellite Communication System: System Design and Equipment Functional Description*, Nov. 15, 1996, AEEC.
ARINC758, *Communications Management Unit*, Apr. 30, 1997, AEEC.
*Inmarsat Aeronautical Services*, Nov. 1998, Inmarsat.
http://www.direcpc.com/about/a36f.html, *About DirecPC*, Nov. 30, 1998.
AT&T Wireless Services, Aviation Communication Division, News Release by: Teri Citterman, Aviation Communications Division and Dennis Schneider, Ariel Corp., *AT&T Selects Ariel Corporation's CompactPCI Remote Access AS Solution to Develop New Airborne Internet Access Service*, Sep. 27, 1999.

* cited by examiner

Primary Examiner—Douglas Olms
Assistant Examiner—Van Nguyen

(57) ABSTRACT

An improved technique for networking multiple users for retrieving data information from various data sources provides a less costly method for retrieving information while aboard a transportation vehicle, such as, for example, an aircraft. The data communications system may be carried out in one form by a data communications system having a data source, a server/router coupled to the data source and adapted to request data information from the data source, and an information distribution system coupled to the server/router and adapted to receive the data information requested from the data source.

21 Claims, 4 Drawing Sheets

NETWORKING SYSTEM FOR MOBILE DATA COMMUNICATIONS

CROSS-REFERENCE TO RELATED APPLICATIONS

This is a continuation-in-part application of U.S. patent application Ser. No. 09/224,214, entitled "Apparatus and Method for Data Communications", and filed on Dec. 30, 1998.

FIELD OF THE INVENTION

The present invention relates to data communications, and more particularly, to communication systems for requesting and receiving data from a remote data source by multiple users.

BACKGROUND OF THE INVENTION

Data communications continue to pervade more aspects of business and personal communications as the technology develops. The increased use of electronic systems to communicate, such as via e-mail, the worldwide web, and various global networks, has brought increased dependence on the availability of such systems. Although many offices and homes are well-connected, mobile data communications are less mature.

Problems associated with mobile data communications are particularly acute on commercial aircraft. Commercial aircraft passengers demand faster and cheaper access to information sources used in their offices and homes, but many options are expensive, impractical, or unavailable. For example, many mobile communications systems rely on cellular modems to connect a computer to a service provider. Cellular systems, however, generally cannot be used on aircraft for a variety of technical and regulatory reasons. In addition, separate long-distance calling charges for each individual caller can be quite expensive.

As another alternative, passengers on commercial aircraft may connect to a service provider using the dedicated air-to-ground telephones available to passengers on some aircraft. Access charges for such telephones, however, are high, especially for low rate or high content data transfers requiring considerable time to complete the transaction.

SUMMARY OF THE INVENTION

A communications system for networking various users according to various aspects of the present invention may comprise an information distribution system, a data source, and a server/router coupled to the information distribution system and the data source and adapted to route information requested from the data source to the information distribution system. The data source may comprise any conventional data source, such as an internet service provider. The information distribution system is coupled to the server/router by any appropriate medium, such as cable, wireless LAN, or telecommunications networks. Similarly, the server/router is coupled to the data source by any appropriate medium, such as wireless LAN, VHF radio signal, or satellite link, and the type of connection may vary according to the availability of various communications media.

BRIEF DESCRIPTION OF THE DRAWING

A more complete understanding of the present invention may be derived by referring to the detailed description and claims when considered in connection with the figures, where like reference numbers refer to similar elements throughout the figures, and:

DETAILED DESCRIPTION OF PREFERRED EMBODIMENTS OF THE INVENTION

The present invention is described in part in terms of functional block components and various processing steps. It should be appreciated that such functional blocks may be realized by any number of hardware and/or software components configured to perform the specified functions. For example, the present invention may employ various integrated circuit components, drivers, antennas, signal processors and the like, which may carry out a variety of functions under the control of one or more microprocessors or other control devices. In addition, the present invention may be practiced in any number of contexts and the data communication system described herein is merely one exemplary application for the invention.

General

Figure 1:
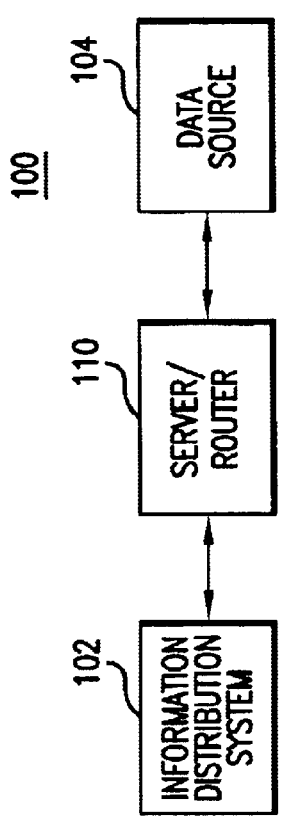
FIG. 1 is a schematic representation of a data communication system in accordance with the present invention.
Figure 2:
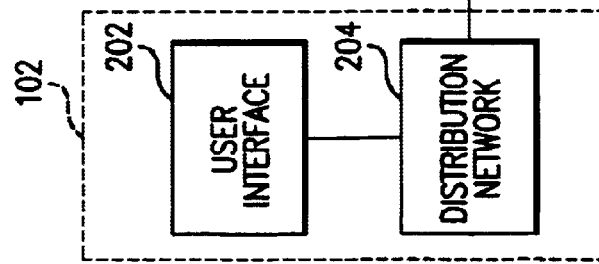
FIG. 2 is schematic representation of a data communication system in accordance with a preferred embodiment of the present invention.

Referring now to FIGS. 1 and 2, in accordance with a preferred embodiment of the present invention, a communications system 100 for networking multiple system users for requesting and receiving information may comprise an information distribution system 102, a data source 104, and a server/router 110. The information distribution system 102 is coupled to the server/router 110 via a first communication medium 206, and the server/router 110 is suitably coupled to the data source 104 via a second communication medium 208. Requests for information by system users are generated via the information distribution system 102 and transmitted to the server/router 110 via the first communication medium 206. In response, the server/router 110 can request information via the second communication medium 208 from the data source 104, or to the extent available locally, the server/router 110 can directly provide the requested information to the information distribution system 102. When requested, the data source 104 transmits the requested information to the server/router 110 via the second communication medium 208. The information distribution system 102 and the server/router 110 are suitably remote from the data source 104. In an exemplary embodiment, the information distribution system 102 and the server/router 110 are located aboard a vehicle, such as a commercial or noncommercial aircraft, helicopter, ship, train, or automobile.

Data Source

Data source 104 suitably stores or channels information, such as news, weather, entertainment, financial, or sports information, or any other type of information, receives requests for information from the server/router 110, and/or transmits the requested data to the server/router 110. The data source 104 may comprise any appropriate source of data, such as an internet service provider (ISP), a host computer system, a remotely accessible network server, a dedicated or general information database configured to store selected information, or other information source capable of storing, retrieving, and/or transmitting requested information.

Information Distribution System

The information distribution system 102 is configured to enable a system user, such as a passenger on an aircraft, ship or automobile, to request information, for example from the data source 104 or a local storage facility, via the server/router 110, and receive desired information from the server/router 110. The information distribution system 102 is suitably configured to transmit a request via the first communication medium 206 in an appropriate format to be used by the server/router 110.

User Interface

With reference now to FIG. 2, the information distribution system 102 suitably comprises a user interface 202 and a distribution network 204. The user interface 202 facilitates communications between a system user and the other components of the communications system 100. For example, the user interface 202 may suitably comprise a computer terminal, such as a keyboard or a tracking device in conjunction with a monitor. Alternatively, user interface 202 may comprise any appropriate system to facilitate the identification of information to be requested and received from the data source 104. In the present embodiment, the user interface 202 comprises a dedicated keyboard and/or tracking device integrated into the passenger position in the aircraft, such as embedded in the armrest or tray table, or a keyboard and/or tracking device of a portable computer connected to, for example, the distribution network 204 to transmit requests to the server/router 110. This configuration suitably facilitates connection of a conventional user component, such as a portable computer, electronic personal organizer, pager, cellular telephone, and the like, to the server/router 110.

The user interface 202 preferably includes a local modem or other suitable communication component for communicating with the server/router 110 via the distribution network 204 and first communication medium 206. Additionally, the user interface 202 suitably includes a connector for connection to the distribution network. In the present embodiment, the user interface 202 is connected to the distribution network via a conventional telephone connector, for example an RJ-11 type telephone connector, with a separate connector for each system user or by way of a shared arrangement of connectors. Alternatively, the user interface 202 may be connected to the distribution network 204 in any other appropriate manner, such as via a wireless link, infrared communication, or optical connection.

Distribution Network

In the present passenger embodiment, the distribution network 204 facilitates multiple system users in transmitting information requests to the server/router 110 to access the data source 104. For example, the distribution network 204 may comprise a conventional telephone network or an on-board communication system configured to connect multiple users via the first communication medium 206 to the server/router 110. In addition, the distribution network 204 may comprise a series of RJ-11 type connectors as described above for connection of multiple users to distribution network 204, such as, for example, with each individual user having a separate RJ-11 connector or a using multiple shared connectors. The distribution network 204 may also include associated cabling and interfaces to facilitate the interconnection to the first communication medium 206.

First Communication Medium

The information distribution system 102 communicates with the server/router 110 via the first communication medium 206, which may comprise any suitable medium according to the characteristics of the information distribution system 102, the server/router 110, and any other appropriate factors, such as the distance between the information distribution system 102 and the server/router 110. Further, the first communication medium 206 may comprise multiple media, which may be used individually or in any appropriate combination to transfer information requests to the server/router 110, as well as the requested data back to the distribution network 204 for distribution to the appropriate system users.

Figure 3:
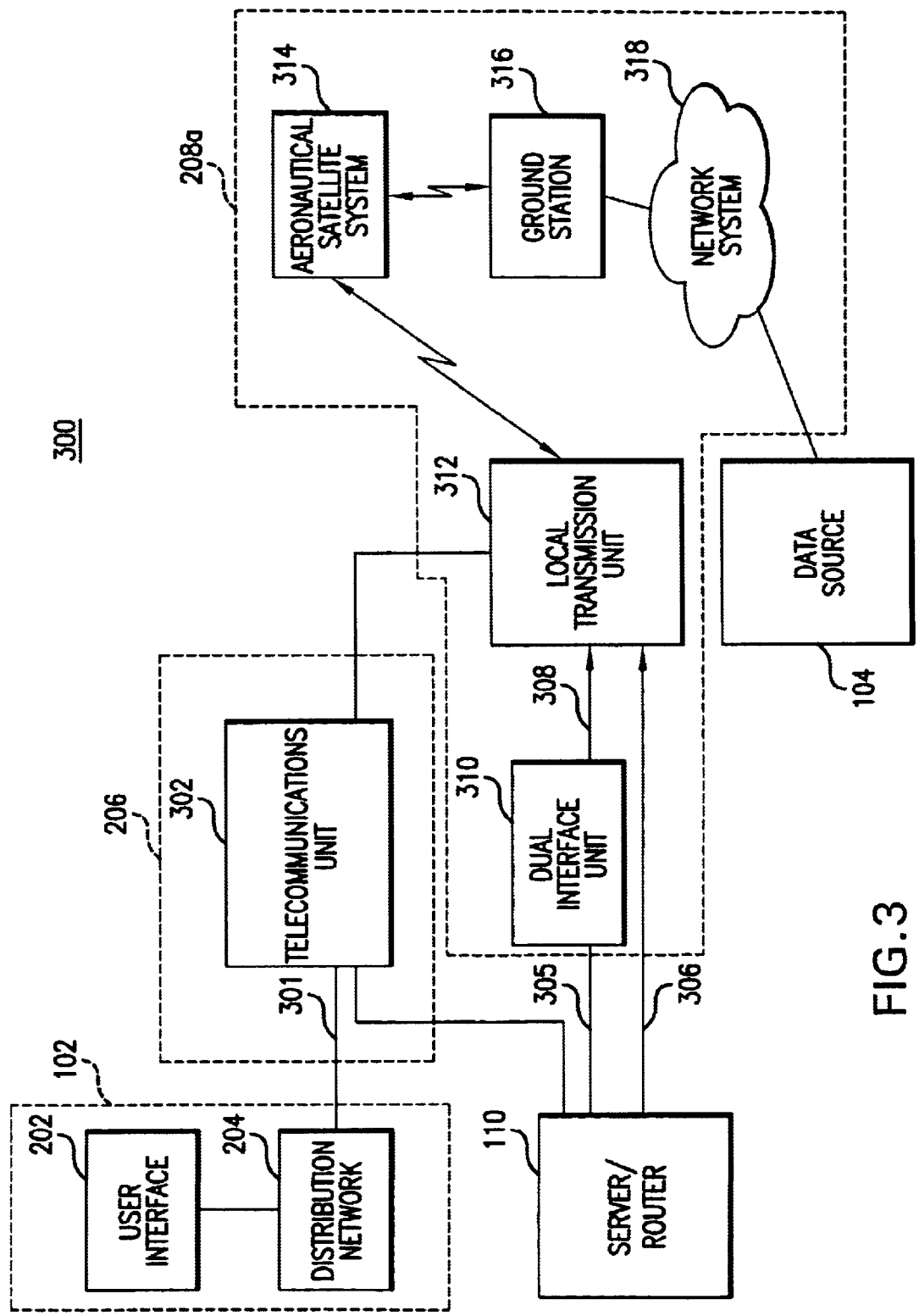
FIG. 3 is a schematic representation of one embodiment of a data communication system as incorporated in a vehicle, such as an aircraft.
Figure 4:
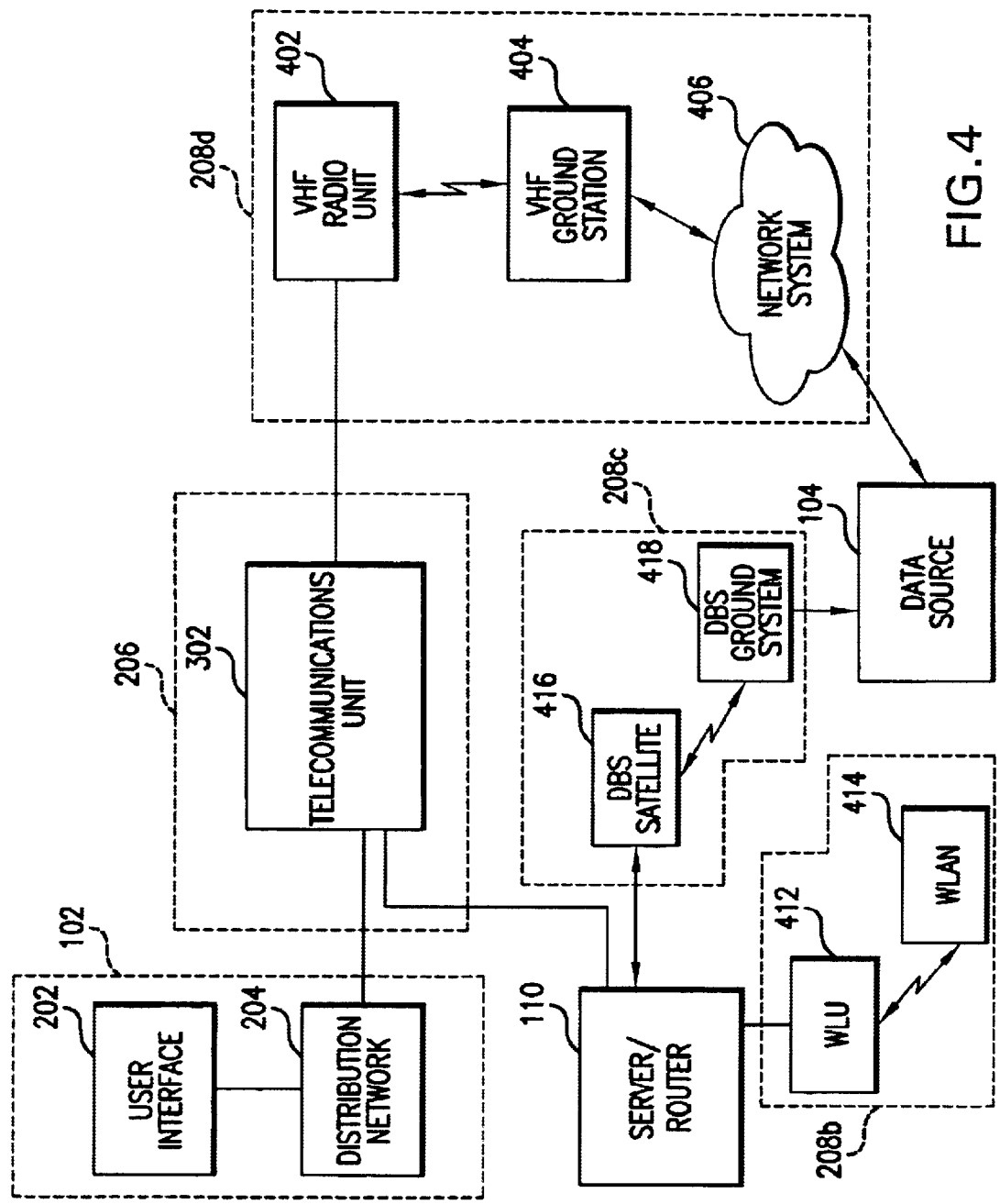
FIG. 4 is a schematic representation of another embodiment of the data communication system shown in FIG. 3.

Referring to FIGS. 3 and 4, the first communication medium 206 may suitably include various networks, such as telephone, cable, and computer networks, or any other suitable communications medium for transferring information to and from the server/router 110. In the present embodiment, first communication medium 206 comprises a telecommunications unit 302 configured to receive information requests from the distribution network 204 and communicate those requests to the server/router 110. The telecommunications unit 302 can comprise any router configured to direct information requests to server/router 110. For example, as system users transmit information requests, such as through end user modems, which are intended for the server/router 110, the telecommunications unit 302 routes the requests of the individual system users to the server/router 110 as appropriate. Moreover, the telecommunications unit 302 may select a suitable interface device on the server/router 110, such as, for example, a particular pool of server modems, depending on the storage location of the requested information, as explained in greater detail below.

In addition, telecommunications unit 302 can be configured as a router to connect to a local transmission unit 312 for aeronautical satellite communications, a VHF/UHF radio unit 402 for radio communications, or through the server/router 110 to a ground wireless LAN unit 412 for local direct communications Accordingly, the telecommunications unit 302 can comprise any conventional switch, e.g., telephone and the like, configured to connect to satellite, VHF/UHF and wireless LAN applications. To facilitate the connection to the distribution network 204, the telecommunications unit 302 may also include a telecommunications interface suitably adapted for various protocols, such as, for example, the CEPT-E1 protocol.

In various applications, the first communication medium 206 may further include public or private communication systems. In addition, the first communication medium 206 may comprise a direct connection between distribution network 204 and server/router 110, for example telephone, cable, fiber optic, or RF networks communicating through various protocols, such as the CEPT-E1 protocol.

Server/Router

The server/router 110 is configured for receiving information requests from the information distribution system 102 via the first communication medium 206, accessing the data source 104 via the second communication medium 208, and then transmitting the requested information back to the information distribution system 102 through media 206 and 208. The server/router 110 preferably comprises a multifunction unit for providing the requested information to information distribution system 102.

Figure 5:
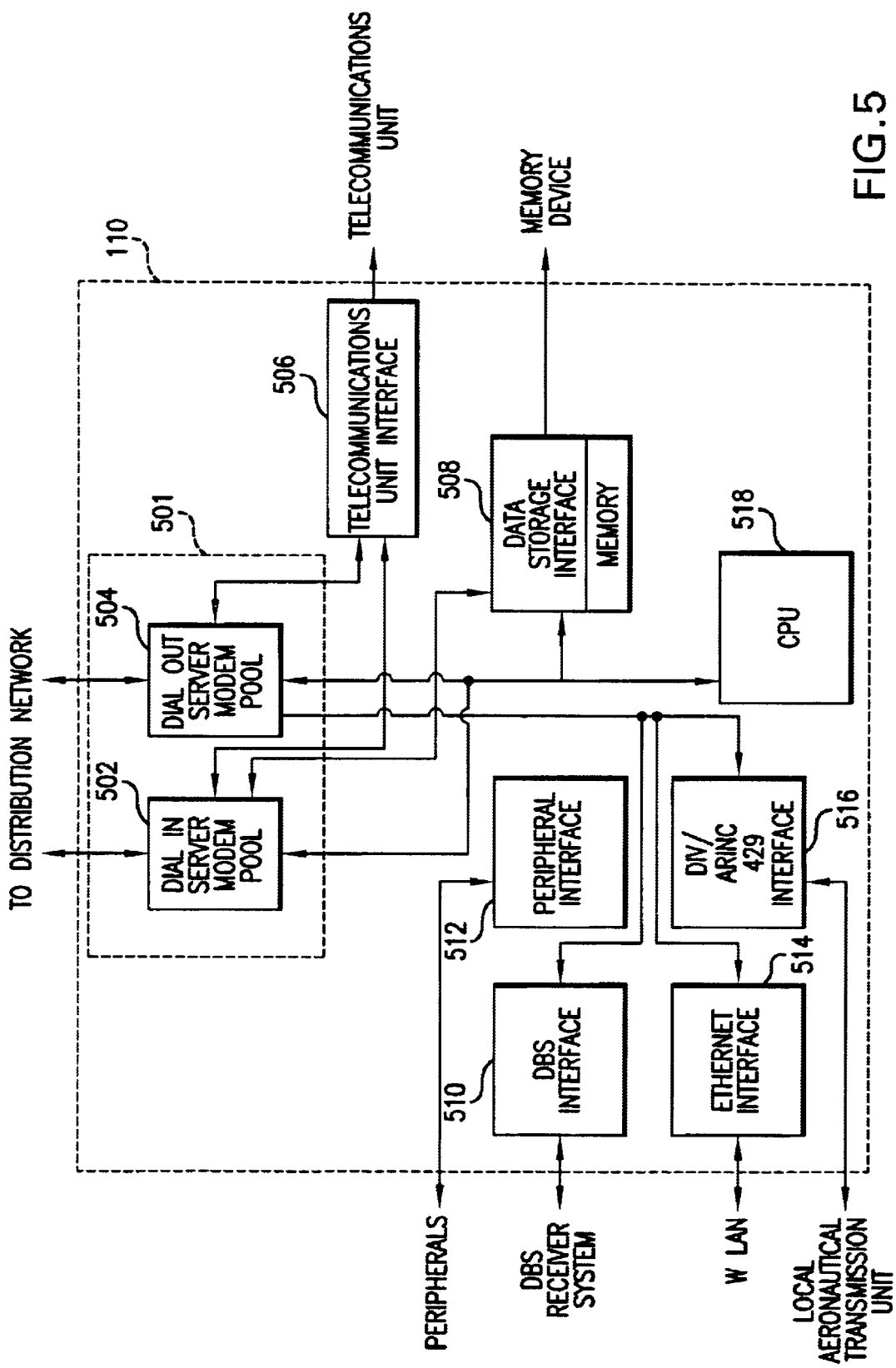
FIG. 5 is a schematic representation of a server/router in accordance with a preferred embodiment of the present invention.

In accordance with this aspect, server/router 110 comprises a network server and/or router for interfacing with information distribution system 102 and accessing the data source 104. For example, server/router 110 may include one or more modems or other suitable interface devices for accessing the data source 104, for example by way of telephonic, satellite, Ethernet, or radio communications. In the present embodiment, with reference to FIG. 5, server/router 110 comprises a pool of server modems 501, a telecommunications interface 506, and any of various interface devices 510, 512, 514, and 516. The server/router 110 may also include a data storage interface 508 for accessing an onboard memory device, or may include local memory 509, for example, cached memory, for frequently requested information such as weather, national news, stock prices or any other popularly requested data. Still further, the server/router 110 may include a central processing unit 518 for providing additional processing and routing capabilities.

Server Modem Pools

Information requests from the information distribution system 102 can be received by the server/router 110 through various server modem pools 501. The pools of server modems 501 may comprise any suitable systems for connecting multiple users to the server/router 110, such as conventional modems or access concentrators configured to permit communications between the information distribution system 102 and server/router 110 to access data. In accordance with one aspect, the server modem pools 501 may be configured to permit the information distribution system 102 to access data locally through the server/router 110, e.g., a "Dial-in" server modem pool 502. The "Dial-in" server modem pool 502 may be connected to the distribution network 204 via the telecommunications unit interface 506, directly connected to the distribution network 204 to receive the information requests, or otherwise connected to the distribution network in an appropriate manner to establish communications. Once a communication link has been established between information distribution system 102 and server/router 110, system end users can readily utilize the data storage interface 508 to access data locally, such as through a peripheral memory device, or end users may access a local memory 509 resident on the server/router 110.

In accordance with another aspect, the server modem pools 501 may be configured to permit the information distribution system 102 to access data remotely, i.e., the server modem pools 501 may also facilitate access by the information distribution system 102 through the server/router 110 to the data source 104. Accordingly, the pool of server modems 501 suitably comprises any system for effecting communications between the server/router 110 and the data source 104, such as conventional modems or access concentrators configured to facilitate communications between the server/router 110 and the data source 104 to permit the information distributions system 102 to access data outside the vehicle. In the present embodiment, the server/router 110 accesses the data source 104 via a "Dial-out" server modem pool 504. The "Dial-out" server modem pool 502 is suitably connected to telecommunications unit interface 506, directly connected to data source 104 to transfer data between the server/router 110 and the data source 104, or otherwise connected to the data source 104.

The "Dial-in" server modem pool 502 and the "Dial-out" server modem pool 504 can be configured as separate pools of modems, or alternatively, can be configured within a single pool of modems. In addition, the pool of server modems 501 can be comprised of various modems, with the various modems adaptively selectable to operate as a "Dial-in" modem, a "Dial-out" modem, or both In accordance with one embodiment, the particular "Dial-in" or "Dial-out" modem can be selected by the telecommunications unit 302, depending on the particular system user and the type of information requested. Moreover, in the present embodiment, the "Dial-in" server modem pool 502 and the "Dial-out" server modem pool 504 can be configured with the telecommunications unit interface 506 on a single card device.

The server/router 110 may also access data from the data source 104 through various other interface devices. The interface devices facilitate communications through the second communication medium 208, and are suitably configured depending upon the particular medium selected. In the present embodiment, the server/router 110 includes a data broadcast satellite interface 510, a peripheral interface 512, an Ethernet interface 514, and a local transmission unit interface 516. However, any combination of these interfaces 510, 512, 514 or 516, or any other suitable interface devices, may be used within or in conjunction with the server/router 110, depending on the desired communication media or system configuration.

Telecommunications Unit Interface

The telecommunications unit interface 506 facilitates communications between the server/router 110 and the information distribution system 102. In the present embodiment, the telecommunications unit interface 506 is configured to communicate with the telecommunications unit 302, which is configured to receive information requests from the distribution network 204, in communicating those requests to the server/router 110. In addition, the telecommunications unit interface 506 can comprise any conventional device for facilitating telecommunications through various communication protocols, such as, for example, through CEPT E1 communications and the like.

DBS Interface

The Direct Broadcast Satellite (DBS) interface 510 is preferably configured to facilitate digital broadcast communications with the data source 104. The DBS interface 510 can comprise any device configured to establish a satellite link, such as the satellite link 208c (FIG. 4) including a satellite 416, with the server/router 110. In this regard, a digital broadcast receiver may be configured within DBS interface 510, or alternatively, the digital broadcast receiver may comprise a component separate from the server/router 110 and suitably be connected to the DBS interface 510.

Peripheral Interface

The peripheral interface 512 is preferably configured within the server/router 110 to facilitate communications with various peripheral devices. For example, the peripheral interface 512 can be configured to suitably connect the server/router 110 to printers, displays, memory devices and the like. Moreover, the peripheral interface 512 may comprise any conventional device for establishing such peripheral communications.

Ethernet Interface

The Ethernet interface 514 may be configured within the server/router 110 to facilitate communications to the data source 104 through a LAN unit, such as, for example wireless LAN unit 412. Preferably, the wireless LAN unit 412 is configured alongside the server/router 110, e.g., configured onboard the vehicle. The Ethernet interface 514 may comprise any appropriate device configured to establish Ethernet communications between the server/router 110 and the wireless LAN unit 412. Accordingly, as will be described in more detail below, the server/router 110 may be suitably configured to communicate through the Ethernet interface 514 to a ground-based LAN unit, such as wireless LAN 414

Local Transmission Unit Interface

The local transmission unit interface 516 is preferably configured within the server/router 110 to facilitate communications to a local transmission unit 312 for conducting aeronautical satellite communications. The local transmission unit interface 516 can be configured to communicate with the local transmission unit 312 through various communication protocols, for example telephone network 2-wire to 4-wire connections or an ARINC 429 avionic protocol.

Second Communication Medium

The second communication medium 208 is configured to facilitate communications between the server/router 110 and the data source 104. The second communication medium 208 may facilitate the transfer of information requests by the server/router 110 to the data source 104, and likewise may facilitate transfer of information from the data source 104 back to the server/router 110. For example, the second communication medium 208 may comprise a wire, infrared signal, microwave signal, fiber optic cable, radio signal, laser signals, or acoustic signals. In addition, second communication medium 208 may comprise a general network system, public or private, suitably coupled to data source 104 and server/router 110 to transmit information, such as a conventional telephone network or television cable network. Moreover, second communication medium 208 may comprise a remote ground data center coupled to data source 104 and configured to facilitate transfer of information between the data source 104 and the server/router 110 via satellite communications, radio communications, wireless cellular communications or direct cable communications and/or the like. Further, the second communication medium 208 may comprise any suitable medium or plurality of media, configured individually or in any suitable combination, according to the characteristics of the data source 104, the server/router 110, and any other appropriate factors, such as the distance between the server/router 10 and the data source 104. Second communication medium 208 may also comprise any arrangement of components and utilize any communication methodology to facilitate the transmission of information between the server/router 110 and the data source 104.

Referring now to FIGS. 3 and 4, in accordance with one embodiment, the second communication medium 208 comprises, among other media, an aeronautical communication link 208a, a wireless LAN link 208b, a direct broadcast satellite link 208c, and/or a VHF radio link 208d. As discussed above, second communication medium 208 may comprise any of communication links 208a–d, either alone or in combination, or any other appropriate communication systems, to facilitate communications between server/router 110 and data source 104.

Aeronautical Communications Link

The aeronautical communication link 208a suitably comprises a conventional satellite communication system for providing communications between an aircraft and another party, such as a ground station or another craft in the present embodiment, the aeronautical communication link 208a suitably comprises a local transmission unit 312, an aeronautical satellite system 314, a ground earth station 316 and a conventional telephone network 318 to facilitate the communication between the server/router 110 and the data source 104.

The local transmission unit 312 is suitably configured to transmit information requests from the server/router 110 to the aeronautical satellite system 314. Moreover, the transmission unit 312 may also be configured as a transceiver to receive data signals from data source 104 through aeronautical satellite system 314. In the present embodiment, the local transmission unit 312 suitably includes a satellite data unit (SDU) for facilitating communications via satellite, for example, by transmitting the information requests from the server/router 110 to the data source 104. The SDU receives the information requests and generates a corresponding signal to be transmitted according to any suitable satellite communication system and technique. For example, the SDU may use a "Data 3" communications protocol (TCP/fP/X.25/W429) to communicate the information request signals to the data source 104. The Data 3 communication protocol provides a standard for a packet switch network to facilitate transmissions without the need for extensive services of telecommunication companies, i.e., without the need for a circuit switched network. Preferably, the SDU is configured to receive two analog telephone channels. In the event more than two telephone channels are desired, local transmission unit 312 can also include a radio frequency unit, such as a conventional MCS7000 radio unit configured to provide several additional channels of communication.

For communicating to the local transmission unit 312, the server/router 110 may utilize various communication media, such as, for example, conventional telephone or cable networks. In a preferred embodiment, the server/router 110 utilizes a telephone network comprising a two-wire to four-wire configuration. In accordance with this embodiment, the second communication medium 208a preferably includes a dual interface unit 310. The dual interface unit 310 comprises a conversion device to facilitate communications through a two-wire terminal 305 to 4-wire terminal 308, which is preferably utilized by the SDU of the local transmission unit 312, i.e., the dual interface unit 310 facilitates the connection of two conventional analog telephone lines to the SDU. Alternatively, the server/router 110 can utilize another connection, such as a packet data function protocol 306, for example ARINC 429, to directly connect to the local transmission unit 312, or may utilize a combination of both, i.e., with dual interface unit 310 and with the packet data function protocol 306.

Via satellite communication protocols, the local transmission unit 312 is configured to communicate with the aeronautical satellite system 310. Preferably, the aeronautical satellite system 310 comprises a satellite unit configured to receive and transmit data signals between local transmission unit 312 and ground earth station 316. Preferably, satellite system 314 comprises an array of satellites strategically orbiting the world, such as the Inmarsat Aeronautical Satellite Communications System or any other suitable satellite communication system, to facilitate the efficient communication of signals substantially regardless of the location of transmission unit 312. Accordingly, depending on the location of the vehicle, e.g., an aircraft in this embodiment, the local transmission unit 312 suitably selects a particular satellite from the satellite system 314, for example according to anticipated cost, clearest signal, or as authorized by the satellite system provider.

Ground earth station 316 preferably includes a transmission and receiving unit capable of communicating with satellite systems and public or private network systems. Various ground earth stations 316 are positioned strategically around the earth in a manner to effectively communicate with the plurality of satellite systems 314. Preferably, a particular ground earth station 316 is selected as a result of the particular satellite system 314 chosen by local transmission unit 312. Alternatively, the local transmission unit 312 can select a particular ground earth station 316 and then utilize a particular satellite system 314 associated with the selected ground earth station 316.

Upon receiving information request signals from transmission unit 306 via satellite system 310, ground earth station 312 is suitably configured to transmit the request signals to the data source 104, such as via a conventional telephone network system 318 or directly to data source 104. Network system 318 preferably comprises a general network system configured to transmit data or voice communications between various communication systems, such as ground stations, internet service providers, direct broadcast systems, or home computer systems. Accordingly, network system 318 can be a private network or a public network, such as a telephone network or television cable network, or any other suitable system for communicating with the data source 104.

Wireless LAN Link

With reference to FIG. 4, the second communication medium 208 may comprise a wireless LAN link 208b for communications between the server/router 110 and the data source 104. The wireless LAN link 208b suitably includes a wireless LAN interface unit 412 for facilitating communications with an off-board wireless LAN 414. LAN interface unit 412 suitably comprises a wireless LAN interface coupled to server/router 110, such as, for example, by connecting to Ethernet interface 514, to facilitate the transfer of information between the server/router 110 and the data source 104. Further, the LAN interface unit 412 may be configured to operate in conjunction with any suitable operating mode and medium, such as wireless communication, direct cable link, optical signal, acoustic signal, and the like.

In addition, the wireless LAN link 208b suitably includes ground-based wireless LAN 414. In accordance with this embodiment, ground-based LAN 414 preferably includes a transmission and receiving unit capable of communicating with the LAN interface unit 412. In accordance with one embodiment, ground-based LAN 414 is an airport LAN configured to communicate with aircraft operating in the airport area, for example within 1000 feet for a wireless LAN 414. Accordingly, ground-based LAN 414 is configured to transmit and receive data signals with the data source 104, for example via another network system or direct communication.

Direct Satellite Link

The second communication medium 208 may also comprise a direct satellite link 208c for communications between server/router 110 and data source 104. The direct satellite link 208c suitably comprises a direct broadcast satellite system 416 and a ground-based direct broadcast system 418. The direct broadcast satellite system 416 is suitably configured to connect to the server/router 110 through the DBS interface unit 510 and transmit data signals between the server/router 110 and the ground-based direct broadcast system 418. Moreover, the ground-based direct broadcast system 418 is configured to transmit and receive data signals with the data source 104, for example via another network system, or alternatively, directly to the data source 104.

VHF Radio Link

As yet another alternative, the second communication medium 208 may comprise a VHF radio link 208d to communicate between the server/router 110 and the data source 104. In accordance with one aspect, a VHF radio unit 402 may be suitably equipped with a modem and configured to provide modem to modem communications. However, VHF radio unit 402 maybe suitably configured with other means of communication to facilitate a communication link between the server/router 110 and a VHF ground system 404. Moreover, the VHF radio unit 402 is preferably coupled to telecommunications unit 302, or alternatively included within local transmission unit 312, to facilitate the transferring of data information between the server/router 110 and the VHF ground system 404. The VHF ground station 404 preferably includes a transmission and receiving unit, such as, for example, a VHF antenna, capable of communicating with VHF radio systems and public or private network systems. Moreover, a plurality of VHF ground stations 404 may be provided strategically around the earth in a manner to effectively communicate with VHF radio unit 402 as it relocates to various positions throughout the world.

Accordingly, upon receiving information request signals from VHF radio unit 402, VHF ground station 404 is suitably configured to communicate data signals to network system 406. The network system 406 comprises a telephone network, such as, for example a public switched telephone network, configured to communicate information to and from the VHF ground station 404 and the data source 104. In one embodiment, the network system 406 may comprise a public switched telephone network for communications between the VHF ground system 404 and the data source 104. Alternatively, the network system 406 may include another ground station, such as, for example, ground station 316, as well as another network system, such as a packet switched network, for facilitating communications to the data source 104.

Although VHF radio link 208d has been described in conjunction with communications between the server/router 110 and the data source 104, VHF radio link may also serve as a communication medium configured between telecommunications unit 302 and data source 104. Accordingly, server/router 110 may first communicate to telecommunications unit 302 prior to communicating with the data source 104 through VHF radio link 208d, or alternatively, may communicate directly through VHF radio link 208d to the data source.

Operation

In the present embodiment, the information distribution system 102 and the server/router 110 are implemented aboard an aircraft or other vehicle for use by the crew and/or the passengers. Using the information distribution system 102, requests for information from multiple users may be submitted through the user interface 202 to the distribution network 204. The distribution network 204 can then distribute multiple requests to the server/router 110, such as through the use of telecommunications unit 302 or other appropriate communications medium. The server/router 110 can determine whether the information requested is available locally, wherein the "Dial-in" modem pool 502 can be utilized, or whether the information requested is to be provided by the data source 104, wherein a "Dial-out" modem pool 504 can be utilized. Accordingly, rather than requiring separate telephonic communication links to be established between each individual user and the data source 104, the server/router 110 can make fewer, possibly even a single telephone connection to route the requested information from the data source to the end user. Thus, through the use of shared resources of the server/router 110 for communicating to the data source 104, access charges and other related costs are significantly reduced.

Closing

The present invention has been described above with reference to a preferred embodiment. However, changes and modifications may be made to the preferred embodiment without departing from the scope of the present invention. For example, the various interface devices and communication components may be implemented in alternate ways depending upon the particular application or in consideration of any number of performance criteria associated with the operation of the system. In addition, the techniques described herein may be extended or modified for use with other modes of transportation utilizing a data communication system. These and other changes or modifications are intended to be included within the scope of the present invention, as expressed in the following claims.

What is claimed is:

1. A data communications system for retrieving data information, said data communications system comprising:
   a data source;
   an information distribution system adapted to request and receive data information from said data source;
   a server/router coupled between said data source and said information distribution system, said server/router including a server modem pool adapted (i) to receive the data information requested by said information distribution system and transmit the data information requested to said data source, and (ii) to receive data signals corresponding to the data information requested from the data source and route the data signals to the information distribution system, said server modem pool comprising:
      a plurality of dial-in server modems adapted to provide multiple users with access to data stored locally on said server/router, and
      a plurality of dial-out server modems adapted to provide the multiple users with access to data stored in said data source;
   whereby said server/router is adapted to network multiple users to facilitate a communication link having multiple information requests between said information distribution system and said data source.

2. A data communication system according to claim 1, wherein said information distribution system transmits requests for data information to said server/router through a first communication medium, and said server/router transmits said data information to said data source through a second communication medium.

3. A data communication system according to claim 1, wherein said server/router further comprises a telecommunications interface for facilitating communications between said information distribution system and said server/router through a first communication medium.

4. A data communication system according to claim 1, wherein said server/router further comprises a plurality of interface devices fro providing access to said data source through a second communication medium.

5. A data communication system according to claim 3, wherein said plurality of interface devices comprises a direct broadcast satellite interface for facilitating communications between the server/router and a direct broadcast satellite system.

6. A data communication system according to claim 3, wherein said plurality of interface devices comprises a peripheral interface for facilitating communications between the server/router and a peripheral device.

7. A data communication system according to claim 3, wherein said plurality of interface devices comprises an Ethernet interface for facilitating communications between the server/router and a wireless LAN unit.

8. A data communication system according to claim 3, wherein said plurality of interface devices comprises a local transmission unit interface for facilitating communications between the server/router and an aeronautical satellite system.

9. A data communication system according to claim 1, wherein said server/router further comprises a local data storage interface for accessing data in a local cached memory.

10. A data communication system according to claim 2, wherein said communication medium comprises a telecommunications unit for facilitating communications between said information distribution system and said server/router.

11. A data communication system according to claim 2, wherein said second communication medium comprises an aeronautical communication link.

12. A data communication system according to claim 11, wherein said aeronautical communication link comprises a local transmission unit, an aeronautical satellite system, a ground earth station, and a telephone network for facilitating communications between said serer/router and said data source.

13. A data communication system according to claim 12, wherein said aeronautical communication link after comprises a dual interface unit for facilitating two-wire to four-wire communications between said server/router and said local transmission unit.

14. A data communication system according to claim 12, wherein said local transmission unit comprises a satellite data unit for facilitating satellite communications.

15. A data communication system according to claim 2, wherein said second communication medium comprises a wireless LAN link.

16. A data communication system according to claim 15, wherein said wireless LAN link comprises a wireless LAN unit and a ground-based LAN for facilitating communication between said server/router and said data source.

17. A data communication system according to claim 2, wherein said second communication medium comprises a direct satellite link.

18. A data communication system according to claim 17, wherein said direct satellite link comprises a direct broadcast satellite system and a ground-based direct broadcast system for facilitating communications between said serer/router and said data source.

19. A data communication system according to claim 2, wherein said second communication medium comprises a VHF radio link.

20. A data communication system according to claim 1, wherein said information distribution system comprises a user interface and a distribution network.

21. A method for networking multiple users in a passenger carrier to provide communications to a data source, said method comprising:
   transmitting multiple data information requests from an information distribution system through a first communication medium to a sever/router having a sever modem pool that includes at least:
      a plurality of dial-in server modems adapted to provide the multiple users with access to data stored locally on said server/router, and
      a plurality of dial-out server modems adapted to provide the multiple users with access to data stored in said data source;
   accessing data information corresponding to the multiple data information requests from (i) said data stored locally on said server/router or (ii) said data stored in said data source through a second communication medium; and
   transmitting the accessed data information from said server/router to said information distribution system.

* * * * *